US008788817B1

(12) United States Patent
Juels et al.

(10) Patent No.: US 8,788,817 B1
(45) Date of Patent: Jul. 22, 2014

(54) METHODS AND APPARATUS FOR SECURE AND RELIABLE TRANSMISSION OF MESSAGES OVER A SILENT ALARM CHANNEL

(75) Inventors: Ari Juels, Brookline, MA (US); Nikolaos Triandopoulos, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 73 days.

(21) Appl. No.: 13/249,957

(22) Filed: Sep. 30, 2011

(51) Int. Cl.
*H04L 29/06* (2006.01)

(52) U.S. Cl.
USPC .......................................... 713/168; 380/259

(58) Field of Classification Search
USPC .......................... 713/168, 176, 150; 380/259
See application file for complete search history.

(56) References Cited

U.S. PATENT DOCUMENTS

| 2004/0123116 A1* | 6/2004 | Jin et al. .................... 713/187 |
| 2005/0124288 A1* | 6/2005 | Karmi et al. ................. 455/3.01 |
| 2007/0033397 A1* | 2/2007 | Phillips, II et al. ............ 713/168 |
| 2007/0116266 A1* | 5/2007 | Greco et al. .................... 380/28 |
| 2008/0037791 A1* | 2/2008 | Jakobsson ..................... 380/278 |
| 2009/0276621 A1* | 11/2009 | Matsuo ........................ 713/155 |
| 2009/0323972 A1* | 12/2009 | Kohno et al. ................. 380/284 |
| 2010/0058077 A1* | 3/2010 | Matsuda et al. .............. 713/194 |

OTHER PUBLICATIONS

Lu et al., "Authenticated Encryption Protocol with Perfect Forward Secrecy for Mobile Communication," 2006, Wiley & Son Ltd., 2006, 273-281.*
Bellare et al., "Forward-Security in Private-Key Cryptography," 2003, Springer-Verlag Berlin Heidelberg, pp. 1-18.*
Shi et al., "Secure Range Queries in Tiered Sensor Network," 2009, IEEE, pp. 945-953.*
Mauw et al., "Forward Secure Communication in Wireless Sensor Networks," 2006, Springer-Verlag Berlin Heidelberg, pp. 32-42.*
Di Ma, "Practical Forward Secure Sequential Aggregate Signatures," 2008, ACM , pp. 341-352.*
Gene Itkis, "Forward Security—Adaptive Cryptography: Time Evolution" 2004, Boston University, pp. 1-27.*
Canetti et al., "Forward-Secure Public-Key Encryption Scheme," 2003, Eurocrypt, pp. 1-26.*
Holt, Jason E., "Logcrypt: Forward Security and Public Verification for Secure Audit Logs",Fourth Australasian Information Security Workshop (AISW-NetSec 2006), pp. 1-9.*
Yavuz, Attila Altay et al., "Hash-Based Sequential Aggregate and Forward Secure Signature for Unattended Wireless Sensor Networks", Mobile and Ubiquitous Systems: Networking & Services, MobiQuitous, 2009. MobiQuitous' 09. 6th Annual International. IEEE, 2009, pp. 1-10.*

* cited by examiner

*Primary Examiner* — Michael Pyzocha
(74) *Attorney, Agent, or Firm* — Ryan, Mason & Lewis, LLP

(57) ABSTRACT

Methods and apparatus are provided for secure and reliable transmission of messages over a silent alarm channel. A plurality of messages are transmitted by obtaining the plurality of messages; and transmitting the plurality of messages on a forward-secure channel to a receiver, wherein the forward-secure channel comprises a buffer having a plurality of entries, wherein each of the entries stores one of the messages and wherein at least one of the plurality of messages is maintained in the forward-secure channel after a receiver reads the channel. Two levels of encryption are optionally performed on the forward-secure channel. The messages carried by the disclosed silent alarm channels can comprise, for example, (i) entries in a security log; (ii) one-time passwords derived by authentication tokens; or (iii) tampering notifications from one or more sensor devices.

39 Claims, 7 Drawing Sheets

1. Initiate an authenticated encryption scheme by running $\sigma_{AE} \leftarrow \text{AEKeyGen}(1^\kappa)$.

2. Initiate a low layer FS-PRNG scheme (to be used for producing the sequence of forward-secure pseudorandom number $r = (r_0, r_1, r_2, ....)$) by running $(s_0, \sigma) \leftarrow \text{GenKey}(1^\kappa)$.

3. Initiate a high layer FS-PRNG scheme (to be used for producing the sequence of forward-secure pseudorandom number $r' = (r'_0, r'_1, r'_2, ....)$) by running $(s'_0, \sigma) \leftarrow \text{GenKey}(1^\kappa)$.

4. Create the first pseudorandom numbers by running $(r_0, s_1) \leftarrow \text{Next}_\sigma(s_0, 1)$ AND $(r'_0, s'_1) \leftarrow \text{Next}_{\sigma'}(s'_0, 1)$.

5. Set $\sigma_{w,0} = \sigma_{r,0} = (r_0, s_1, r'_0, s'_1, 0, 0)$, $\sigma_w = \sigma_r = (\sigma, \sigma')$ and $pk = \sigma_{AE}$.

6. Return $(((\sigma_{w,0}, \sigma_{r,0}), (\sigma_w, \sigma_r), pk)$.

FIG. 6

1. If $t \leq 0$, then return $(r_i, r'_j, i, j)$.

2. If $b$ = low then (a) Create the next low layer pseudorandom number by running $r_{i+t} \leftarrow \text{Next}_\sigma(r_i, t)$.

(b) Delete $r_i$.

(c) Return $(r_{i+t}, r'_j, i+t, j)$.

3. If $b$ = high then (a) Create the next high layer pseudorandom number by running $r'_{j+t} \leftarrow \text{Next}_{\sigma'}(r'_j, t)$.

(b) Delete $r'_j$.

(c) Return $(r_i, r'_{j+t}, i, j+t)$.

700

900

1. Compute encapsulated buffer by running $c' \leftarrow \text{AuthEnc}_f(C)$.
2. Set $\hat{C} = (c', j)$.
3. Update the secret writing keys by running $(r_i, r'_{j+1}, i, j+1) \leftarrow \text{KEvolve}_{\sigma,\sigma'}(r_i, r'_j, i, j, 1, \text{high})$.
5. Delete $r'_j$.
6. Return $(r_i, r'_{j+1}, i, j+1)$ AND $\hat{C}$.

1. If $j' \leq j$, then return $[(\tau_i, \tau'_j, i, j), (\perp,...,\perp)]$.
2. Update the secret reading keys by running $(\tau_i, \tau'_j, i, j') \leftarrow \text{KEvolve}_{\sigma,\sigma'}(\tau_i, \tau'_j, i, j, j' - j, \text{high})$.
3. Remove encapsulation of $\hat{C} = (c', j')$ by running $C \leftarrow \text{AuthDec}_{\tau'_j}(c')$.
4. If $C = \perp$, then return $[(\tau_i, \tau'_j, i, j), (\perp,...,\perp)]$.
5. View $C$ as an array $C[0], C[1],..., C[T-1], C[T]$.
6. Set $I = C[T]$ and if $I < 0$ or $I \geq T$ then return $[(\tau_i, \tau'_j, i, j), (\perp,...,\perp)]$.
7. Set $x = 0$.
8. For $0 \leq k < T$, do the following:
   (a) Read $C[k + I \mod T]$ as $(c, l)$.
   (b) If $l \leq i$, then return $[(\tau_i, \tau'_j, i, j), (\perp,...,\perp)]$.
   (c) If $k = 0$ then set $x = l$.
   (d) If $k \neq 0$ then:
      i. If $l \neq x + 1$, then return $[(\tau_i, \tau'_j, i, j), (\perp,...,\perp)]$.
      ii. Set $x = l$.
   (e) Update the secret reading keys by running $(\tau_l, \tau'_j, l, j') \leftarrow \text{KEvolve}_{\sigma,\sigma'}(\tau_i, \tau'_j, i, j', l - i, \text{low})$.
   (f) Decrypt message ciphertext $c$ by running $m_k \leftarrow \text{AuthDec}_{\tau_l}(c)$.
9. Set $M = (m_0, m_1,..., m_{T-1})$.
10. Return $(\tau_l, \tau'_j, l, j')$ and $M$.

METHODS AND APPARATUS FOR SECURE AND RELIABLE TRANSMISSION OF MESSAGES OVER A SILENT ALARM CHANNEL

FIELD OF THE INVENTION

The present invention relates generally to techniques for secure transmission of messages over a network or other types of communication systems.

BACKGROUND OF THE INVENTION

When an attacker compromises a computing system, the attacker can evade discovery most effectively by corrupting the system's detection and signaling mechanisms. For instance, on infecting a host, a virus will often try to disable or conceal itself from anti-virus software. Many systems therefore attempt to defend themselves pre-emptively, as an attack is unfolding. Intrusion detection systems, for instance, analyze the behavior of a range of devices in order to isolate security breaches in their early stages, before they achieve extensive system compromise.

Tampering is notably problematic, for example, in security logs. An attacker can corrupt a device's log in exactly the same way that it can corrupt other defensive tools such as anti-virus software. The attacker can even remove or omit log entries that might raise suspicions of the presence of the attacker.

Tools such as forward-secure logging prevent modification of existing log entries, and thus ensure the accuracy of logs compiled prior to a security breach. For a more detailed discussion of forward-secure logging, see, for example, Mihir Bellare and Bennet Yee, "Forward-Security in Private-Key Cryptography," Proc. of the 2003 RSA Conf. on The Cryptographers' Track (CT-RSA'03), 1-18 (Berlin, Heidelberg, 2003), incorporated by reference herein. After a breach, an attacker may compromise the logging system itself, thereby corrupting future log entries. Forward-secure logging is most valuable while an attack is unfolding, when a system has the opportunity to log signals of impending compromise, such as failed local authentication attempts, the installation of suspicious executables, and so forth. Such unmodified pre-breach log entries can furnish critical evidence of attack.

The critical window of time, however, between the first indications of an impending compromise and the compromise itself can be narrow. Log analysis tools easily overlook such short-lived periods of evidence. Many large-scale systems alter or sample logs to winnow down the floods of data that originate from large numbers of networked devices. In doing so, slivers of critical log data can be dropped.

Additionally, in a system where periods of evidence are regularly dropped, go unprocessed, or are otherwise altered, an attacker can exploit the expected existence of log-analysis gaps. The attacker can maliciously delete the entries in the critical window that carry the most compelling evidence of its presence on the machine. The resulting omission will go undetected, since the receiver cannot distinguish between missing log events that are omitted due to expected alterations and those that are deleted by the attacker.

A need therefore exists for improved techniques for signaling an intrusion after an attacker has compromised a device. For example, a need exists for improved signaling techniques that allow a device to log alerts that persist for long periods of time, and that allow a device to place alerts in its log after the device has been compromised by an attacker.

SUMMARY OF THE INVENTION

The present invention in the illustrative embodiments described herein provides methods and apparatus for secure transmission of messages over a silent alarm channel. According to one aspect of the invention, a plurality of messages are transmitted by obtaining the plurality of messages; and transmitting the plurality of messages on a forward-secure channel to a receiver, wherein the forward-secure channel comprises a buffer having a plurality of entries, wherein each of the entries stores one of the messages and wherein at least one of the plurality of messages is maintained in the forward-secure channel after a receiver reads the channel.

According to another aspect of the invention, two levels of encryption are optionally performed on the forward-secure channel. A first level of encryption encrypts each of the plurality of messages using an authenticated encryption scheme. A second level of encryption encrypts the forward-secure channel itself that contains the encrypted messages, using a wrap function. An exemplary wrap function processes a secret writing key and the buffer and encapsulates the buffer.

The transmitting step can be performed by a write function that processes a secret writing key, one of the messages and the buffer and encodes the message in the buffer at an entry determined by an index. The transmitting step optionally transmits the plurality of messages redundantly.

An exemplary key generation algorithm generates a pair of initial evolving secret keys; a pair of permanent secret update keys; and/or a public key. An exemplary key evolution algorithm updates a writing key and/or a reading key using a corresponding update key.

According to yet another aspect of the invention, the receiver reads the channel, for example, using an exemplary read function that processes a secret reading key and an encapsulated buffer. The exemplary read function also decodes the plurality of entries in the buffer, updates the secret reading key and returns the updated secret reading key and a sequence of messages from the plurality of entries.

A number of applications of the disclosed silent alarm channels are also provided. For example, the messages carried by the silent alarm channels can comprise (i) entries in a security log; (ii) one-time passwords derived by authentication tokens; and (iii) tampering notifications from one or more sensor devices.

The communication techniques of the illustrative embodiments overcome one or more of the problems associated with the conventional techniques described previously, and permit devices to securely transmit messages over a silent alarm channel. Moreover, no modification of the applications or communication protocols is required. These and other features and advantages of the present invention will become more readily apparent from the accompanying drawings and the following detailed description.

BRIEF DESCRIPTION OF THE DRAWINGS

FIG. 5 illustrates pseudo code for an exemplary implementation of a key generation algorithm incorporating aspects of the present invention;

FIG. 6 illustrates pseudo code for an exemplary implementation of a key evolve algorithm incorporating aspects of the present invention;

FIG. 11 illustrates pseudo code for an exemplary implementation of a read algorithm incorporating aspects of the present invention.

DETAILED DESCRIPTION

Figure 1:
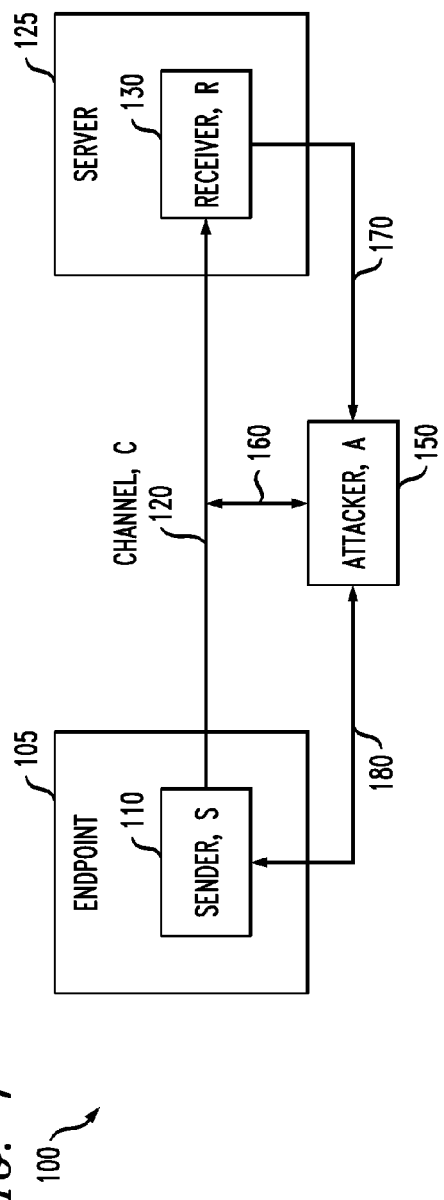
FIG. 1 illustrates an exemplary network environment in which the present invention can operate.

The present invention provides methods and apparatus for secure transmission of messages over a silent alarm channel. The disclosed silent alarm channels, for example, can signal an intrusion after an attacker has compromised a device. As used herein, a silent alarm is a cryptographically protected channel between a potentially compromised device and a trustworthy log-collection point or server. According to various aspects of the invention, the cryptographically protected channel carries a message that is persistent and stealthy (i.e., an undetectable message that may be read for a long period of time). Thus, even after compromising a device, an attacker cannot determine whether there is a message in the channel and cannot block the channel without being detected. In one exemplary implementation, the transmitting device itself does not know whether it is transmitting an alert over the channel.

Consider the following example. Alice is defending a fort against Eve's army. Alice sends daily status reports to Bob by specially trained pigeons. If Eve captures the fort (and pigeons), of course, Eve can impersonate Alice and send false reports to Bob. Thus, Alice creates a silent alarm channel that works as follows. Alice has two boxes of colored paper (blue and yellow). Alice and Bob randomly agree on a color (say, blue) that signals Alice is "safe." Alice keeps this color on her desk for her messages. If Alice sees Eve approach and has enough time to do so, Alice swaps the other color (yellow) onto her desk.

On capturing the fort, Eve does not know which color is "safe." Thus, Eve can't tell whether Alice made a swap or not. If Alice did make a swap, and Eve sends yellow messages, Eve continuously warns Bob of the fort's loss. In other words, Alice's alarm is transmitted persistently. Eve could choose not to send daily reports, but that would raise Bob's suspicions.

If Eve suspects that Alice made a swap, Eve can reverse it (i.e., put blue back on the desk). In the disclosed exemplary full, cryptographic construction, another enforced property is immutability: An attacker can't modify messages in the channel.

By analogy, the disclosed channel can be thought of as a sealed box (like a street corner postal box), with multiple slots. An endpoint device (Alice) can insert a new message into a slot at any time in a round-robin fashion (overwriting old messages). Similarly, a receiver (Bob) can check the full set of messages in the box at any time. An adversary (Eve) that gets access to the box, though, can't tell how many, if any, messages the box contains or what the contents of any messages might be. Additionally, the adversary can't modify messages in the box. Thus, even if Bob inspects the box after Eve has gained access to it, Bob will see messages that Alice placed in the box prior to the compromise.

Silent alarms are formally defined as a cryptographic primitive. The disclosed exemplary silent alarm channels encompass the properties of stealthiness and immutability described above. In addition, persistence of the silent alarm channels can be provided as a feature of the exemplary datastructure that is employed to implement the silent alarm channels. Silent alarm channels enable the transmission of multiple, arbitrarily-long messages. The disclosed silent alarm channels are based in part on generalized funkspiel schemes. See, for example, Johan Hastad et al., "Funkspiel Schemes: An Alternative to Conventional Tamper Resistance," CCS '00, Proc. of the 7th ACM conference on Computer and Communications Security, 125-133 (2000), incorporated by reference herein. Generally, Funkspiel schemes effectively penult only a one-time, one-bit message.

The examplary construction for silent alarms builds on two components: (1) Authenticated Encryption; and (2) Forward-Secure Pseudo-Random Number Generators (FS-PRNGs). It is noted that public-key-based variants are also possible, as would be apparent to a person of ordinary skill in the art.

Authenticated Encryption

The disclosed silent alarm scheme makes use of authenticated encryption. Six different authenticated encryption modes, namely OCB 2.0, Key Wrap, CCM, EAX, Encrypt-then-MAC and GCM, have been standardized in ISO/IEC 19772:2009 (Authenticated Encryption). Bellare and Namprempre show that an encrypt-then-MAC (Message Authentication Code) scheme provides NM-CPA secrecy and INT-PTXT, provided that the MAC scheme is strongly unforgeable. See, e.g., Mihir Bellare and Chanathip Namprempre, "Authenticated Encryption: Relations among Notions and Analysis of the Generic Composition Paradigm," J. Cryptol., 21:469-491 (2008), incorporated by reference herein.

More formally, in the symmetric key setting, an authenticated encryption scheme is a triple of algorithms (AEKeyGen, AuthEnc, AuthDec), as follows:

An AEKeyGen Algorithm takes as input a security parameter and returns a secret key $\sigma_{AE}$ to be used by the encryption and decryption algorithms, expressed as follows:

$$\sigma_{AE} \leftarrow AEKeyGen(1^\kappa)$$

An AuthEnc Algorithm takes as input the secret key $\sigma_{AE}$ and a message m and returns a ciphertext c, expressed as follows:

$$c \leftarrow AuthEnc\sigma_{AE}(m).$$

An AuthDec Algorithm takes as input a secret key $\sigma_{AE}$ and a ciphertext c and either returns m or $\perp$, the latter denoting invalid, i.e., non-authenticated, encryption c, expressed as follows:

$$\{m, \perp\} \leftarrow AuthDec\sigma_{AE}(c).$$

Security of an authenticated encryption scheme is provided by the combined properties of an encryption scheme and a signature scheme (or MAC), i.e., privacy and integrity. That is, if the ciphertext has not been tampered with, decryption returns the original encrypted message, whose confidentiality is protected by the ciphertext. It is again noted that public-key variants are possible, as would be apparent to a person of ordinary skill in the art.

Forward-Secure PRNGs

The disclosed scheme also makes use of forward-secure cryptography, with forward-secure pseudorandom number generators (FS-PRNGs) a primitive of particular importance.

In a survey of forward-secure cryptography, Itkis characterizes an FS-PRNG in terms of a binary tree. See, G. Itkis, Handbook of Information Security, Chapter Forward Security: Adaptive Cryptography—Time Evolution, John Wiley and Sons (2006), incorporated by reference herein. The root is a random seed s. A left child is derived from its parent by application of a suitable one-way function $f_0$, the right child by application of $f_1$. A node at depth d may then be defined in terms of a binary label $B=b_0 b_1 \ldots b_d$ specifying the sequence of applications of the one-way functions, where $b_i$ denotes application of $f_{b_i}$. Itkis notes that an FS-PRNG may be defined for any (finite or infinite) set of labels L that is prefixless: The $t^{th}$ output $l_t$ corresponds to the $t^{th}$ largest label in L. Suppose there are two labels a and b, such that a is a prefix of b. Then a is an ancestor of b. Thus, after a is output, it is necessary to retain a in order to compute b. But retaining a after a has already been output compromises forward security.

The simplest such scheme is one in which L consists of all labels of the form 0'1. A drawback is that computing an arbitrary output $l_t$ requires t computations. Itkis proposes a simple scheme that requires only O(log t) computations to compute $l_t$ from s: Let the label B for $l_t$ be a prefixless encoding of t followed by t itself.

The exemplary embodiments of the disclosed silent alarm channels use any FS-PRNG scheme (that possibly achieves different trade-offs between the basic cost parameters). For ease of illustration, the details of the FS-PRNG in use are abstracted by considering the following general description of an FS-PRNG scheme.

An FS-PRNG scheme is a pair of algorithms (GenKey, Next), as follows:

A GenKey Algorithm takes as input a security parameter and returns an initial state $s_0$ and a master secret key $\sigma$, expressed as follows:

$(s_0, \sigma) \leftarrow GenKey(1^\kappa)$.

A Next Algorithm takes as input the master secret key $\sigma$, the current state $s_i$, $i \geq 0$, and an integer $t > 0$, updates the state to $s_{i+t}$ and returns a pseudorandom number $r_{i+t-1}$, expressed as follows:

$(r_{i+t-1}, s_{i+t}) \leftarrow Next_\sigma(s_i, t)$.

For simplicity, $r_{i+t} \leftarrow Next_\sigma(r_i, t)$ denotes the generation of the pseudorandom number that is t steps ahead, and for the common case where $t=1$ and $i > 0$, $r_{i+1} \leftarrow Next_\sigma(r_i)$ (where the number $r_i$ is used as input instead of the state $s_i$ and state $s_{i+1}$ is omitted as output for ease of illustration) denotes the generation of the next pseudorandom number.

With respect to the security of an FS-PRNG scheme, it holds that given $\{s_{i+t}\}$, $t > 0$, it is hard to compute any older pseudorandom number $r_j$, $j \leq i$.

For the common case where $t=1$ above, can consider that the sequence $r=(r_0, r_1, r_2, \ldots)$ corresponds to a one-way hash chain.

Silent Alarm Definitions

Silent alarms are described as a new general-purpose cryptographic primitive for reliable, confidential and tamper-resistant message transmissions. The functionality of silent alarms is initially provided in an idealized setting where adversarial behavior is inherently restricted. Thereafter, formal definitions are provided in a realistic setting where silent alarms find applications.

Ideal-Model Description

The functionality of the disclosed silent alarm channels is expressed in an abstract setting that captures only its necessary operational features. Accordingly, the security properties of the silent alarm channels are also defined in relation to some maximally restricted exported interface, and as such, they offer a description of which tasks an adversary can legitimately perform using the primitive and which are infeasible to perform. This way, the security properties are easier to understand.

Silent Alarms as a Special Secure Channel

FIG. 1 illustrates a network environment where the present invention can be employed. As shown in FIG. 1, a sender S (110) and a receiver R (130) that communicate through a channel C (120), as discussed further below in conjunction with FIG. 2, that by design is used to transmit from S to R messages that belong in a fixed, bounded-size language L. In the exemplary embodiment, the sender S (110) is part of an endpoint 105 and the receiver R (130) is part of a server 125. L is viewed as a subset of a universe U of all possible messages that are transmittable through C, where, in particular, $U = L \cup \{\emptyset, \bot\}$ for a special null message $\emptyset$ and a special failure message $\bot$. Communication through C is asynchronous, meaning that messages in L sent by S through C do not necessarily reach R instantaneously, if at all. Instead, the exemplary channel C is viewed as a fixed-capacity memory buffer that can be accessed through a special write/read interface and which can simultaneously send up to T distinct messages in L. In this view, the channel C consists of T cells or slots (entries), each used to store one message in U; C[i] denotes the content of the (i+1)th such slot. The existence of an index $I \in \{0, \ldots, T-1\}$ specifying the current slot is assumed, the slot at which a new message written in the channel is to be stored. In more detail, the basic read/write interface exported by the channel is as follows.

Given an input message $m \in L$, the sender S can perform a write(m) operation on C, which adds message m in C by setting $C[I] \leftarrow m$ and advancing $I \leftarrow I+1 \mod T$. It is assumed that C is initiated to $C[i] = \emptyset$, $i \in \{0, \ldots, T-1\}$, with I randomly chosen, i.e., $I \xleftarrow{\$} \{0, \ldots T-1\}$.

Analogously, the receiver R can perform a read( ) operation, which returns a pair (M,I) where M is a sequence $(m_1, \ldots m_T)$ of the messages contained in C, where $m_{i+1} = C[i] \in L \cup \{\emptyset, \bot\}$, $i \in \{0, \ldots, T-1\}$, and I is the current index I of C. The read operation produces messages $(m_1, \ldots m_T)$; written as follows: $(m_1, \ldots m_t) \leftarrow read( )$.

It is noted that, with respect to the channel's contents, write operations are always stateful, as they change the channel's internal state. In contrast, read operations may be stateless, i.e., they may not affect the channel's internal state. Also, note that after the first T write operations, messages are stored in C in a FIFO manner, i.e., the oldest message is evicted to write a new message.

Silent alarms correspond to a specific channel C that is controlled by an adversary or attacker A 150 (FIG. 1). Consider an adversary A that can get access to the read/write interface of the channel in a specific restricted format, and that can additionally get access to a special interface through which messages contained in the channel can be destroyed. Generally, may observe/control communications 160 from the sender S, may observe behavior/reactions 170 of the server 125 and/or may gradually completely compromise 180 the endpoint 105.

More specifically:

Definition 1 (Silent Alarms—Ideal Model.) Let $f: U^* \to \{0,1\}^*$ be any function that operates on a set of messages in U. An adversary A controls channel C with leakage through $f$, if the following take place:

The channel is initialized to $C[i]=\emptyset$, $i \in \{0, \ldots, T-1\}$ with $I \xleftarrow{\$} \{0, \ldots, T-1\}$, and the receiver maintains a sequence P of produced messages by read operations, initially set to $P=(\emptyset)$.

The sender S then during phase I makes use of the channel C for the transmission of messages in L. The receiver R asynchronously performs a series of read operations on C, and after the jth such operation $(m_1^j, \ldots, m_T^j) \leftarrow \text{read}_f()$ the produced messages $m_1^j, \ldots, m_T^j) \leftarrow \text{read}_f()$ are appended in the current sequence P, i.e., $P \leftarrow P \| (m_1^j, \ldots, m_T^j)$, where $\|$ denotes sequence concatenation (i.e., (b,a,c)||(e,d)=(b, a, c, e, d)). At this point, the adversary A is also given access to the receiver's produced messages in P through $f$, that is, A learns $f(P)$.

At some time t* of its choice during an Attack Phase, the adversary A takes full control of the sender S and learns the current index I of C. t* is the time of compromise.

After time t*, during phase II, while still having access to function $f$ applied on the current sequence of produced messages, the adversary A additionally gets exclusively access to:

(a) regular write operations, thus being able to insert into C messages from L of its choice; and (b) a special operation corrupt which, given an index j as input, $j \in \{0, \ldots, T-1\}$, sets the content of the (j+1)th slot of C to the failure message $\bot$, i.e., $$\{C[j] \leftarrow \bot\} \leftarrow \text{corrupt}(j).$$

A silent alarm is a channel C that can be controlled by an adversary A as above but where all read operations are stateless, i.e., they do not alter the contents of the channel. That is, two or more consecutive read operations with no write operation in between produce exactly the same sequence of messages.

Relation to Real Model

The security properties that silent alarms adopt directly from Definition 1 are now discussed. First, recall that during normal operation, channel C is used by the sender to asynchronously transmit to the receiver messages from an underlying language L: during a specific time window, depending on the rate as which messages are written in the channel and the rate by which messages are read from it, a given written message may be produced by the receiver (i.e., included in sequence P) zero, one or more times.

Next, considering an adversarial behavior over the channel, Definition 1 significantly restricts the way an adversary A can get access to C. In particular:

During phase I, A may have only limited access to the messages transmitted through C, namely oracle access to function $f$ that leaks information about the produced messages by R.

At the point of compromise, the adversary fully controls the sender and also learns the current slot in the channel.

During phase II, A additionally has full control over the write operations of the sender S and also the special corrupt operations: from this point on, only messages of A's choice are added in the channel, and A may selectively destroy the contents of slots in C of its choice—while still being able to learn information, leaked through $f$, about the produced messages.

Phases I and II can be associated to the corresponding phases of the silent alarm functionality under an adversarial attack in the real model.

Phase I corresponds to the pre-compromise state of the disclosed silent alarm system, where the adversary A gets only to see the publicly observable actions of the receiver R. In general, these actions depend on the messages produced by R, and this dependency is captured by a leakage function $f$. Note that $f$ operates on the ordered sequence P of produced messages which captures the chronological order they were produced with, thus modeling a very general set of observable actions.

The attack phase corresponds to the full compromise of the sender by the adversary and, in particular, the internal current index is learned by the adversary.

Phase II corresponds to the post-compromise state of the disclosed silent alarm system, where the adversary gets to choose which messages can be written into the channel or be destroyed. This is of course in addition to its ability to learn R's publicly observable actions.

Combined with Definition 1, this restricted access over the channel implies several important security properties for any real model implementation of silent alarms. In particular:

1. Silent alarms provide stealthiness of transmitted messages. That is, A can learn nothing about the contents of C, not explicitly added in it by A itself, that is not implied by direct application of the leakage function $f$ on the produced messages at the receiver R. Indeed, in A's view channel C is a black box, and at all times A has limited access to its contents:

(a) At pre-compromise state, A can at best learn only what is leaked through $f$ about the contents of the channel. This implies that C itself perfectly hides its contents. Not only can messages in the channel be written such that the adversary never learns them, but also the adversary doesn't even learn of their existence. Information about specific contents or changes in the contents may only be inferred through function $f$.

(b) At the full-compromise state, A cannot learn the messages that are present in the channel or even learn if such messages exist in the channel, unless function $f$ allows such related information to leak.

(c) At the post-compromise state, A of course completely controls all the messages that are added in the channel, as well as the positions of the messages that are failed to produce at the receiver. As before, A can examine what information is leaked by these messages through function $f$.

Overall, A may only learn those messages explicitly written by itself in the post-compromise state and whatever information is implied by R's publicly observable actions (leaked through function $f$ applied on R's produced messages).

2. Silent alarms provide immutability of transmitted messages. In particular, A cannot forge the messages that are contained in the channel at the time of compromise. Indeed, although A takes full control of S, A may only make two uses of the channel: (1) A may either write legitimate messages in L, or (2) destroy the delivery of chosen messages but in a detectable way, since the special failure message is substituted (and thus produced by R). Consequently, A cannot alter any message: any produced no failure/null message at R corresponds to a valid message in L that was written in C by S prior to, or by A after the time of compromise. Additionally, A cannot change the order of the messages in the channel, since only message deletions are permitted: A can only destroy the delivery of chosen messages but cannot alter the order with which they are produced by R.

There exists an additional important property that silent alarms enjoy, namely silent alarms provide persistence of message transmissions. Due to the stateless reads, the silent alarm system can be configured so that any message written once in the channel by the sender is produced more than once by the receiver. For instance, consider the configuration setting where write and read operations occur at the same fixed rates. Although this can be seen as an algorithmic or structural property of silent alarms, it also has significant security implications.

Forward-Secure Logging

The functionality of the disclosed silent alarms can be contrasted with that of forward-secure logging schemes. A forward-secure logging scheme is a channel C of unlimited capacity where reads are destructive, i.e., the destroy the contents of the channel, that can be controlled by an adversary A who can at all times learn how many non-empty messages are contained in C. In this way, common practices and existing technologies for forward-secure logging provide only immutability of messages, but neither stealthiness nor persistence. More formally:

Definition 2 (Forward-Secure Logging—Ideal Model)—A forward-secure logging scheme is a channel C of infinite size (T=+∞) that can be controlled by an adversary A such that:

All read operations are destructive, i.e., they do alter the contents of the channel by deleting the produced messages from the channel. That is, two consecutive $read_1$ and $read_2$ operations on a non-empty channel C and with no write operation in between produce respectively the sequences of messages $read_1( ) \to (m_k, \ldots, m_k) \neq \emptyset \leftarrow read_2( )$, where k is the number of non-empty messages in C, returned by the $read_1$ operation.

At all times, A has access to a special operation count which takes no input and returns the number t of non-empty messages contained in C.

Real Model Description

An exemplary definitional framework is provided for silent alarms. A formal definition is initially provided for the new primitive. As before, channel C is viewed as a fixed-capacity memory buffer, but for ease of illustration C is now of size T+1, C=(C[0], C[1], . . . , C[T]), where the current index I is stored at the last position T+1, and we use the terms channel and buffer interchangeably.

Definition 3 (Silent Alarms)—An exemplary silent alarm scheme SA comprises a quintuple of polynomial time algorithms {KGen, KEvolve, Write, Wrap, Read} such that:

The key generation algorithm (KGen) is a probabilistic algorithm with security parameter κ that returns a pair $(\sigma_{w,0}, \sigma_{r,0})$ of initial evolving secret keys, where $\sigma_{w,0}$ is a secret writing key and $\sigma_{r,0}$ is the secret reading key, a pair $(\sigma_w, \sigma_r)$ of permanent secret update keys, and a public key pk (to be used by all algorithms), expressed as $((\sigma_{w,0}, \sigma_{r,0}), (\sigma_w, \sigma_r), pk) \leftarrow KGen(1^\kappa)$.

The key evolution algorithm (KEvolve) is a deterministic algorithm that takes as input a secret writing $\sigma_{w,j}$ or reading $\sigma_{r,j}$ key, the corresponding update key $\sigma_w$ or $\sigma_r$, a step integer t and an auxiliary information b, and updates the writing, or reading, key to $\sigma_{w,j+t}$ or $\sigma_{r,j+t}$ respectively, expressed as $\sigma_{w,j+t} \leftarrow KEvolve_{\sigma_w}(\sigma_{w,j}, t, b)$ and $\sigma_{r,j+t} \leftarrow KEvolve_{\sigma_r}(\sigma_{r,j}, t, b)$, where for simplicity the update keys $\sigma_w$ and $\sigma_r$ are considered as implicit inputs of the algorithm.

A probabilistic algorithm Write takes as input a secret writing key $\sigma_{w,j}$, a message $m \in \{0,1\}^*$ and a buffer C, encodes m in buffer C at a slot determined by C and $\sigma_{w,j}$, updates the writing key by running algorithm $KEvolve_{\sigma_w}$ and returns the updated key $\sigma_{w,j+1} \leftarrow KEvolve_{\sigma_w}(\sigma_{w,j}, 1, b)$ and an updated buffer C. Write adds m in C, expressed as $(\sigma_{w,j+1}, C') \leftarrow Write((\sigma_{w,j}, m, C)$.

A probabilistic algorithm Wrap takes as input a secret writing key $\sigma_{w,j}$ and a buffer C, encodes C, updates the writing key by running algorithm $KEvolve_{\sigma_w}$ and returns an updated key $\sigma_{w,j+1} \leftarrow KEvolve_{\sigma_w}(\sigma_{w,j}, 1, b)$ and an encapsulated buffer $\hat{C}$. Wrap encapsulates C to $\hat{C}$, expressed as $(\sigma_{w,j+1}, \hat{C}) \leftarrow Wrap(\sigma_{w,j}, C)$.

A deterministic algorithm Read takes as input a secret reading key $\sigma_{r,j}$ and an encapsulated buffer $\hat{C}$, decodes all buffer slots, updates the reading key by running algorithm $KEvolve_{\sigma_r}$, and returns an updated key $\sigma_{r,j+t} \leftarrow KEvolve_{\sigma_r}(\sigma_{r,j}, t, b)$ for some t≥0 and a sequence $M=(m_1, \ldots, m_T)$ of T messages in $U=L \cup \{\emptyset, \bot\}$. Read produces messages M and $write(\sigma_{r,j+1}, M) \leftarrow Read(\sigma_{r,j}, \hat{C})$.

As discussed further below in conjunction with FIG. 4, silent alarms generally operate as follows. First the appropriate evolving and permanent keys are distributed to the sender S and the receiver R by running algorithm KGen: S gets $(\sigma_{w,0}, \sigma_w)$ and R gets $(\sigma_{r,0}, \sigma_r)$. Also, the public key pk is known to any algorithm. These keys are part of the secret states that S and R maintain at all times. (Evolving keys implement forward security for symmetric-key schemes, whereas permanent keys implement either optimizations for the forward security mechanisms or simply public-key schemes.) With an initially empty buffer C where the current index is initially set to point to a random position in C, sender S can then start adding messages in an encoded format in channel C using algorithm Write. At any point in time, algorithm Wrap can be used by S to finalize the current contents of buffer C into an encapsulation format $\hat{C}$ which is then transmitted to receiver R. Each such received encapsulated buffer $\hat{C}$ can be unpacked, decoded and finally read by R using algorithm Read. Finally, algorithms Write, Wrap and Read use as a subroutine algorithm KEvolve. Algorithm Read needs not run in synchronization with algorithms Write and Wrap: in particular, keys $\sigma_{w,j}$ and $\sigma_{r,j}$ need not evolve in coordination or at the same pattern or speed; instead, at a given point in time S and R generally store keys $\sigma_{w,j_w}$ and $\sigma_{r,j_r}$ respectively, with $j_w \geq j_r$.

At a minimum, under normal operation, silent alarms reliably transmit messages in L, in an order-preserving manner within individual encapsulated buffers. Accordingly:

Definition 4 (Correctness.)—Let SA={KGen, KEvolve, Write, Wrap, Read} be a silent alarm scheme. SA is said to be correct if the following hold:

1. There exists a buffer $C_\emptyset$ such that its corresponding encapsulation $\hat{C}_\emptyset$ produces a sequence $E=(\emptyset, \ldots, \emptyset)$ of T empty messages. That is, for any $j_w$, there exists a buffer $C_\emptyset$ such that, $(\sigma_{w,j_w}, \hat{C}_\emptyset)$ and there exist $j_r$ and t≥0 so that $(\sigma_{r,j_r+t}, E) \leftarrow Read(\sigma_{r,j_r}, \hat{C}_\emptyset)$.

2. Let $C_\emptyset$ be as above. Then, if any k≥0 non-empty messages are added in $C_\emptyset$, a corresponding encapsulation will produce exactly min{T,k} most recent such non-empty messages. That is, for any $j_w$, any k and s, and any sequence of messages $(m_1, \ldots, m_{k+1})$, $m_i \in L \cup \emptyset$, 1≤i≤k+x, such that exactly s of these messages are empty, if (a) $C_1 = C_\emptyset$, (b) then for 1≤l≤k+s, $(\sigma_{w,j_w+l}, C_{l+1}) \leftarrow Write(\sigma_{w,j_w+l-1}, m_l, C_l)$ if $m_l \neq \emptyset$, or $(\sigma_{w,j_w+l}, \hat{C}_l) \leftarrow Wrap(\sigma_{w,j_w+l-1}, C_l)$ if $m_l = \emptyset$, and (c) $\hat{C}$ is so that $(\sigma_{w,j_w+k+s+1}, \hat{C}) \leftarrow Wrap(\sigma_{w,j_w+k+s}, C_{k+s})$, then (a) there exist an index $j_r$ and t≥0 so that $(Y_{r,j_{r+t}}, M) \leftarrow Read(\sigma_{r,j_r}, \hat{C})$, (b) $M=(\emptyset, \ldots, \emptyset, m_1, \ldots, m_k)$ if k<T or $M=(m_{k-T+1}, \ldots, m_{k-1}, m_k)$ if k≥T, and (c) with all but negligible probability such index $j_r$ and t≥0 are unique.

Two of the security properties of silent alarms, immutability and stealthiness, can be captured for illustration using two corresponding security games played by an adversary A while having access to some special oracles that make use of the silent alarm algorithms. In particular, the following oracles are defined:

WriteO$_\sigma$—Keeping state ($\sigma_{w,j}$, $\sigma_w$, C) and given as input a possibly empty sequence of messages $\mu=(m_1, \ldots, m_k)$, $m_i \in \{0,1\}^*$, $k \geq 0$, it updates its state to ($\sigma_{w,j+k+1}$, $\sigma_w$, $C_k$) and returns encapsulated buffer $\hat{C}$, where ($\sigma_{w,j+k+1}$, $\hat{C}$)←Wrap($\sigma_{w,j+k}$, $C_k$), ($\sigma_{w,j+l}$, $C_{l+1}$)←Write($\sigma_{w,j+l-1}$, $m_l$, $C_l$), $1 \leq l \leq k$, and $C_0 = C_1 = C$.

LeakO$_{\sigma,f}$—Let $f:U^* \leftarrow \{0,1\}^*$ be any fixed leakage function. Keeping state ($\sigma_{r,j}$, $\sigma_r$, $P_z$) and given as input an encapsulated buffer $\hat{C}$, it updates its state to ($\sigma_{r,j+t}$, $\sigma_r$, $P_{j+1}$) for some $t \geq 0$, and returns $f(P_{z+1})$, where ($\sigma_{r,j+t}$, M)←Read($\Lambda_{r,j}$, $\hat{C}$) and $P_{z+1} = P_z \| M$.

Consider a powerful adversary A that fully compromises the sender S, thus capturing its secret state and getting control over the current buffer C. Prior to the compromise, the adversary A is assumed to actively control the transmissions between S and the receiver R. In particular, the adversary may adaptively select the messages that S adds in its buffer C and when to encapsulate C to $\hat{C}$. Moreover, each such encapsulated buffer produced by S is handed back to the adversary who then decides either to deliver it, or to indefinitely deny delivery of it, or to modify $\hat{C}$ to one or more encapsulated buffers of its choice which are delivered to R. That is, the adversary can effectively perform arbitrary modifications, deletions, injections or reordering to the set of encapsulated buffers produced by S before their delivery to R. Thus, the adversary is in fact the communication channel (at the transmission layer), similarly to the Dolev-Yao adversarial model. Additionally, the adversary has access to the complete history of messages produced by the receiver R through an arbitrary but fixed leakage function $f$. Overall, the adversary acts adaptively, including the time at which it chooses to compromise S.

Immutability refers to an integrity property for the sequence of messages that are produced by the receiver: any received non-empty message is either an invalid message that the adversary has tampered with (e.g., modified or deleted) or a valid message in L that (1) has been written in the channel after the time in which the most recently received message was written in the channel, and (2) has arrived while preserving its order. And this holds even when the adversary launches an adaptive chosen message attack prior to or after the compromise (similar to the standard notion of security for digital signatures), learns the secret state of S at the time of compromise, and even if at all times information about the produced messages at P leaks to the adversary through an arbitrary function. More formally:

Definition 5 (Immutability.)—Probabilistic algorithms SA={KGen, KEvolve, Write, Wrap, Read} constitute an immutable silent alarm scheme if, for any leakage function $f:U^* \rightarrow \{0,1\}^*$, no probabilistic polynomial-time adversary A can win non-negligibly often in the security parameter $\kappa$ in the following game $\text{GImmume}_f(\kappa)$:

Algorithm KGen initially runs on $\kappa$ i.e., (($\sigma_{w,0}$, $\sigma_{r,0}$), ($\sigma_w$, $\sigma_r$), pk)←KGen($1^\kappa$), and oracles WriteO$_\sigma$, LeakO$_{\sigma,f}$ are initialized respectively with ($\sigma_{w,0}$, $\sigma_w$, $C_\emptyset$) and ($\sigma_{r,0}$, $\sigma_r$, $P_0 = \{\}$), where $C_\emptyset$ is the empty buffer with corresponding encapsulated buffer $\hat{C}_\emptyset$.

During Phase I, the adversary A is given the empty encapsulated buffer $\hat{C}_\emptyset$ and oracle access to oracles WriteO$_\sigma$ and LeakO$_{\sigma,f}$. That is, A makes arbitrary use of oracles WriteO$_\sigma$ and LeakO$_{\sigma,f}$ on inputs $\mu_1, \ldots, \mu_{l_1}$, $\mu_i = (m_1^i, \ldots, m_{t_i}^i)$, $i \in \{1, \ldots l_1\}$, and respectively $\hat{C}_1, \ldots, \hat{C}_{l_1}$, all of its choice, where $$\sum_{i=1}^{l_1} t_i = k_1.$$

At any time of its choice, A proceeds to the next phase.

During Phase II, the adversary A is given the state ($\sigma_{w,j}$, $\sigma_w$, C) of oracle WriteO$_\sigma$, where ($\sigma_{w,j}$, $\hat{C}$)←Wrap($\sigma_{w,j-1}$, C) is the last invocation of algorithm Wrap by oracle WriteO$_\sigma$, in phase I, and oracle access to LeakO$_{\sigma,f}$. That is, A may run algorithms Write and Wrap on inputs ($m_1^{l_1+1}$, $C'_1$), $\ldots$, ($m_{k_2}^{l_1+1}$, $C'_{k_2}$) and $\overline{C}_1, \ldots, \overline{C}_{l_2}$ of its choice, and A also makes arbitrary use of oracle LeakO$_{\sigma,f}$ on inputs $\check{C}_1, \check{C}_2, \ldots, \check{C}_{l_3}$, also of its choice, where $k_1 + k_2 = k$, $l_1 + l_2 = l$ and $l_1 + l_2 = l$ and k, l, l∈poly($\kappa$). At any time of its choice, A proceeds to the attack phase.

At the end, the adversary A outputs an encapsulated buffer $\hat{C}^*$.

Let $M^* = (m_1, \ldots, m_T)$ denote the messages produced by $\hat{C}^*$ through algorithm Read, let $M_i$, $1 \leq i \leq l$, be the messages produced by the i-th call of oracle LeakO$_{\sigma,f}$, and let $M = \|_{i=1}^l M_i$ be the sequence of all produced messages by LeakO$_{\sigma,f}$. If $m = m_{i_1}^{j_1}$ and $m' = m_{i_2}^{j_2}$ are messages written in the channel in phase I or II above, we say that m precedes m' if $j_1 < j_2$ or $j_1 = j_2$ and $i_1 < i_2$, i.e., if m was written in the channel before m'.

The adversary is said to win the above game if either of the following three occurs:

1. There exists a message $m^* \notin \{\emptyset, \bot\}$ such that $m^* \in M \| M^*$ but at the same time $m^* \notin \mu_i$, for all $1 \leq i \leq l_1$, and $m^* \notin \{m_1^{l_1+1}, \ldots, m_{k_2}^{l_1+1}\}$.

2. There exists a message $m^* \in M^*$ such that $m^* \notin \{\emptyset, \bot\}$ but at the same time $m^*$ precedes message $m_T^l$ where $M_l = (m_1^l, \ldots, m_T^l)$, i.e., the most recently produced message.

3. There exist messages $m^*, m^{**} \in M^* = (m_1, \ldots, m_T)$ such that $m^* = m_i \notin \{\emptyset, \bot\}$ and $m^{**} = m_j \notin \{\emptyset, \bot\}$ with $i > j$ but at the same time $m^*$ precedes $m^{**}$.

Stealthiness refers to a privacy property for the set of messages that are encoded and encapsulated by the sender S: any, arbitrarily long, sequence of encapsulated buffers satisfies ciphertext indistinguishability, i.e., the adversary A cannot distinguish among two such sequences of its choice. This holds, in the strongest possible setting where the adversary learns the secret state of S at the time of compromise and launches some sort of adaptive chosen ciphertext attack prior to or after the compromise (i.e., similar to IND-CCA2), where access to the encryption oracle is unrestricted and access to the decryption oracle is controlled by the information leakage through an arbitrary but fixed leakage function $f$. More formally:

Definition 6 (Prefix-equivalence)—Let $p = (p_1, \ldots, p_t)$, $q = (q_1, \ldots, q_t)$, $r = (r_1, \ldots, r_s)$, $t > 0$, $s \geq 0$, be any three sequences of messages in U, and let $f: U^* \rightarrow \{0,1\}^*$ be any leakage function. For any sequence P of size t, let pr(p,i), $1 \leq i \leq t$, denote the prefix of size i of sequence p, i.e., pr(p,i) = $(p_1, \ldots, p_i)$. Sequences p and q are said to be equivalent with respect to leakage $f$ and common prefix r, if for any $i \leq t$ it holds that $f(r \| pr(p,i)) = f(r \| pr(q,i))$, where $\|$ denotes sequence concatenation.

Definition 7 (Stealthiness)—Probabilistic algorithms SA={KGen, KEvolve, Write, Wrap, Read} constitute a stealthy silent alarm scheme if, for any leakage function $f: U^* \rightarrow \{0,1\}^*$, no probabilistic polynomial-time adversary A can win non-negligibly often in the security parameter $\kappa$ in the following game $\text{GStealthy}_f(\kappa)$ against a challenger C:

At initialization, Algorithm KGen runs on $\kappa$ (($\sigma_{w,0}$, $\sigma_{r,0}$), ($\sigma_w$, $\sigma_r$), pk)←KGen($1^\kappa$), and oracles WriteO$_\sigma$, LeakP$_{\sigma,f}$ are initialized respectively with $(\sigma_{w,0}, \sigma_w, C_\varnothing)$ and $(\sigma_{r,0}, \sigma_r, P_0 = \{\})$, where $C_\varnothing$ is the empty buffer with corresponding encapsulated buffer $\hat{C}_\varnothing$.

During Phase I, the adversary A is given the empty encapsulated buffer $\hat{C}_\varnothing$ and oracle access to oracles $\text{WriteO}_\sigma$, and $\text{LeakO}_{\sigma,f}$. That is, A makes arbitrary use of oracles $\text{WriteO}_\sigma$ and $\text{LeakO}_{\sigma,f}$ on inputs $\mu_1, \ldots, \mu_{l_1}$, $\mu_i = (m_1^i, \ldots, m_{z_i}^i)$, and respectively $\hat{C}_1, \ldots, \hat{C}_{l_1}$, all of its choice, where $$\sum_{i=1}^{l_1} z_i = k_1.$$

At any time of its choice, A proceeds to the next phase.

During Selection, the adversary A forms two transcripts $T_0$ and $T_1$, where $T_s(M_1^s, M_2^s, \ldots, M_t^s)$, $s \in \{0,1\}$, and, for $1 \leq j \leq t$, $M_j^s$ is a sequence of messages of size $x_j \geq 0$, where $$\sum_{j=1}^{t} x_j = k_2.$$

Transcript $T_i$ is, in fact, itself a sequence of messages.

During a Challenge, the challenger X selects a random bit $b \xleftarrow{\$} \{0,1\}$ and is given transcripts $T_0$ and $T_1$ and access to oracle $\text{WriteO}_\sigma$, used by A in phase I. Then, X makes t sequential invocations of $\text{WriteO}_\sigma$ to compute the sequence $H_b = (\tilde{C}_1, \ldots, \tilde{C}_t)$ where, for $1 \leq j \leq t$, $\tilde{C}_j$ is the encapsulated buffer that is returned by the j-th invocation of $\text{WriteO}_\sigma$ by X on input $M_j^b$.

During Phase II, the adversary A is given the sequence $H_b$ computed in the challenge phase, the state $(\sigma_{w,j}, \sigma_w, C)$ of oracle $\text{WriteO}_\sigma$, where $(\sigma_{w,k}, \tilde{C}) \leftarrow \text{Wrap}(\sigma_{w,j-1}, C)$ is the last invocation of algorithm Wrap by oracle $\text{WriteO}_\sigma$ in the challenge phase, and oracle access to $\text{LeakO}_{\sigma,f}$. That is, A may run algorithms Write and Wrap on inputs $(m_1^{l_1+1}, C'_1), \ldots, (m_{k_3}^{l_1+1}, C'_{k_3})$ and $\overline{C}_1, \ldots, \overline{C}_{l_2}$ of its choice, and A also makes arbitrary use of oracle $\text{LeakO}_{\sigma,f}$ on inputs $C''_1, C''_2, \ldots, C''_{l_2}$, also of its choice, where $k_1 + k_2 + k_3 = k$, $l_1 + l_2 = l$ and $l_1 + l_2 = 2$ and k, l, $l \in \text{poly}(\kappa)$. At any time of its choice, A proceeds to the attack phase.

At the end (Attack Phase), the adversary A outputs a bit $\hat{b}$.

Let $\mu = (m_1^1, \ldots, m_{z_1}^1, m_1^2, \ldots, m_{z_2}^2, \ldots, m_1^{l_1}, \ldots, m_{z_{l_1}}^{l_1})$ be the sequence of $k_1$ messages used by adversary A in the $l_1$ invocations of $\text{WriteO}_\sigma$ in phase I. The adversary is said to win the above game if: (1) transcripts $T_0$ and $T_1$ are prefix-equivalent with respect to leakage $f$ and common prefix $\mu$; and (2) $\hat{b} = b$.

An exemplary correct, immutable and stealthy silent alarm scheme inherits the following properties. First, correctness dictates that under normal operation any sufficiently small sequence of messages that are added in the channel by the sender can be correctly produced by the receiver in a order-preserving way, independently of the number of times that algorithm Wrap runs in between. In particular, at any point in time, the channel can be encapsulated to a buffer that can produce in their correct precedence order the T most recent messages added in the channel. Note that correctness implies that the receiver can determine the most recently added message.

Second, immutability dictates that, even after a full compromise of the sender by an adversary, if valid (i.e., non-empty and non-failure) messages are produced at the receiver in some order, then it must be the case that these exact messages were explicitly added in the channel by the (possibly compromised) sender in the same order. In particular, it is not possible for an adversary that fully takes control of the channel to undetectably alter an existing message in the channel or alter the order with which messages are produced (either within or outside the buffers in which they have been encapsulated). Note that this in turn implies that it is not possible for any adversary to perform a truncation, replay or reorder attack (or otherwise the scheme is not immutable as message order is altered).

Finally, stealthiness dictates that to an adversary who initially observes the full history of encapsulated buffers before fully compromising the sender, information about the contents in the channel can only be inferred through the indirect leakage occurring by the publicly observable actions of the receiver. In particular, such an adversary cannot distinguish the history of transmitted buffers from a random one.

A non-cryptographic (yet important for the applications of the disclosed silent alarms) property of an exemplary silent alarm scheme is now defined.

Definition 8 (Persistence)—An exemplary silent alarm scheme is said to be persistent if T sequential additions in the channel of messages $m_1, \ldots, m_T$, each followed by a Wrap operation results in encapsulated buffers $\hat{C}_1, \ldots, \hat{C}_T$ that produce message $m_1$ exactly T times.

In other words, by reading the channel frequently enough (through separate encapsulations), it is possible to produce a given message more than once. This is a particularly important property in cases where the underlying transmission channel is lossy. Note that alternative equivalent formal definitions may be given to capture this rather intuitive property.

Silent Alarms

Constructions

A general architectural design and cryptographic construction is presented for building an exemplary silent alarm scheme, using a top-down description.

Design Features and Intuition of Constructions

Forward-secure logging (alone) does not meet the definitions of a silent alarm scheme. As discussed above in conjunction with Definition 2, forward-secure logging refers to implementing an asynchronous communication channel through an append-only and read-once arbitrary-long buffer.

In particular, the channel C can be viewed as an ordered set of messages organized as a linked list where a new message is added in the channel simply by "appending" this message at the end of the list. Messages in this forward-secure channel can be effectively read only once: a read operation reads the current contents of the channel, but these contents are then deleted from the channel. That is, reads are destructive in the sense that a read operation produces all messages currently contained in the linked list, but simultaneously the channel is initialized with a new, empty linked list. Of course, at all times the messages contained in the channel C can be protected (with respect to their integrity and confidentiality) by secret-key forward-secure cryptography, meaning that knowledge of the secret key at some point in time does not compromise the (integrity or confidentiality of those) messages that were added in C at an earlier point in time.

It should be clear why the above scheme does not comprise a silent alarm, as defined herein. An append-only and read-once scheme is neither immutable nor stealthy. First, an adversary can trivially perform a truncation attack by failing to transmit an arbitrarily long "suffix" of the linked list, i.e., some of the latest messages. Furthermore, an adversary can trivially inspect whether a message has been added in the channel by simply checking the length of the linked list. Additionally, however, the above scheme is not persistent, inherently due to the fact that reads are destructive, thus individual messages are transmitted exactly once.

To rectify the above limitations, the disclosed exemplary construction of silent alarm channels are based on the following important design features:

1. To enable persistent message delivery, the disclosed exemplary construction of silent alarm channels departs from the destructive nature of legacy logging infrastructures and considers an underlying channel that is non destructive, i.e., its contents are transmitted redundantly.

2. To protect against counting-based inference of message transmission as well as truncation attacks, the disclosed exemplary construction of silent alarm channels departs from the append-only type of existing logging schemes and considers a fixed-capacity channel, i.e., messages are stored in a fixed-size buffer.

3. To protect against content-based inference of message transmission as well as reordering attacks, the disclosed exemplary construction of silent alarm channels employs two layers of hierarchical authenticated encryption that are refreshed any time the channel is accessed by the sender.

The above design features achieve the desired properties of immutability, stealthiness and persistence.

First, by considering a channel that is not destructive, the disclosed exemplary construction of silent alarm channels explicitly enforces the following important property over the channel C: After a non-destructive read operation there exists at least one message that remains in the channel and, thus, at least one message that can be produced in the next read operation over the channel. This means that over time message transmission occurs in a redundant way. In turn, this feature provides the foundation for designing a systematic process for deciding which message(s) will remain in the channel after a read and which will be deleted. Towards this goal and to maintain the efficiency and practicality of the channel, the exemplary channel is implemented as a buffer of finite (bounded) but dynamic (not necessarily fixed) size. The above design enables persistence: by setting the buffer in the appropriate size and by adopting a corresponding policy for "evicting" older messages after reads, or more precisely, for deciding which messages to remove from the buffer after a write operation, different degrees of persistence can be can achieved.

Second, by considering a buffer of fixed size, inference of whether or not any messages were added in the channel is disallowed. Fixed buffer size also helps to eliminate truncation attacks, as these attacks now become trivially detectable.

Third, by considering two layers of authenticated encryption over the messages in the buffer (one layer at the message level and one at the buffer level) additional properties are achieved with respect to the confidentiality and integrity of message transmissions. In particular, the lower layer of authenticated encryption ensures the confidentiality and integrity protection of the actual messages as well as the integrity of the order of the messages within a transmitted buffer. Analogously, the higher layer authenticated encryption ensures confidentiality and order-preserving integrity protection across different transmitted buffers.

Main Construction

Figure 2:
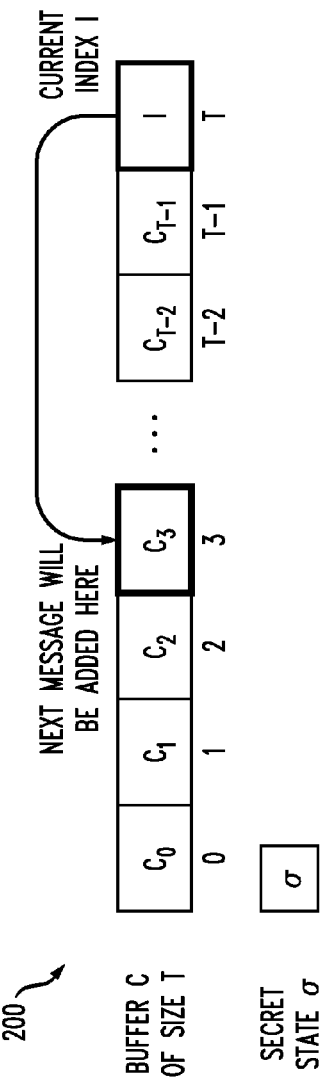
FIG. 2 illustrates an exemplary data structure that can be employed to realize the channel C that incorporates aspects of the present invention.

FIG. 2 illustrates an exemplary data structure 200 that can be employed to realize the channel C that incorporates aspects of the present invention. At all times, the sender S maintains the following three components of state information:

1. a secret key a;
2. a buffer C, C=(C[0],C[1], . . . , C[T−1]), initially empty; and,
3. a current index I, initially pointing to a random position in C.

As shown in FIG. 2, the exemplary buffer C is an array of size T+1, where C[i], $0 \leq i \leq T$, denotes the ith position in C. The current index I can be stored in an entry of the data structure 200 and is a variable that takes on values in $\{0, \ldots, T-1\}$, denoting the designated available position where a new message can be stored, and is itself stored at C[T].

Figure 3:
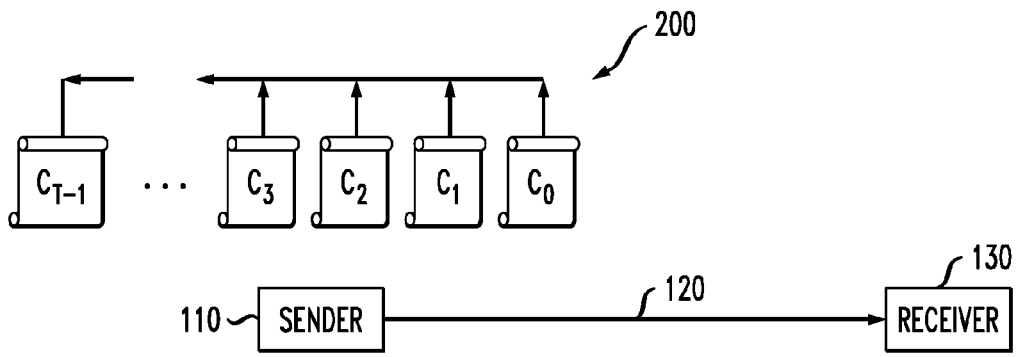
FIG. 3 illustrates a sender transmitting an encapsulated version of the data structure of FIG. 2 to a receiver over a channel in accordance with an aspect of the present invention.

FIG. 3 illustrates the sender S (110) transmitting an encapsulated version of the data structure 200 of FIG. 2 to the receiver R (130) over the channel C (120). In accordance with the forward secure logging aspects of the present invention, the messages in the data structure 200 are (sequentially) signed in a chain by the Write algorithm, as discussed further below in conjunction with FIG. 7, prior to the encapsulation of the data structure 200 by the Wrap algorithm, as discussed further below in conjunction with FIG. 9.

Figure 4:
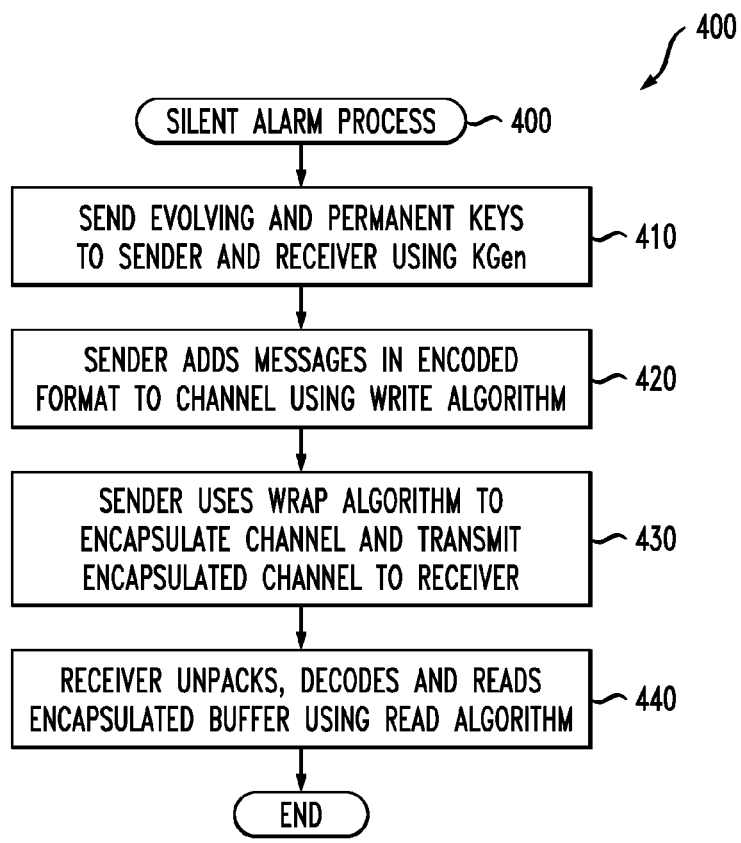
FIG. 4 is a flow chart describing an exemplary implementation of a silent alarm process incorporating aspects of the present invention.

FIG. 4 is a flow chart describing an exemplary implementation of a silent alarm process 400 incorporating aspects of the present invention. As shown in FIG. 4, the exemplary silent alarm process 400 initially distributes the appropriate evolving and permanent keys to the sender S and the receiver R during step 410 by running algorithm KGen: S gets $(\sigma_{w,0}, \sigma_w)$ and R gets $(\sigma_{r,0}, \sigma_r)$. These keys are part of the secret states that S and R maintain at all times. (Evolving keys implement forward security for symmetric-key schemes, whereas permanent keys implement either optimizations for the forward security mechanisms or simply public-key schemes.)

On an initially empty buffer C with randomly selected initial current index, the sender S can then start adding messages during step 420 in an encoded format in channel C using algorithm Write. At any point in time, algorithm Wrap can be used by mPtPr during step 430 to finalize the current contents of buffer C into an encapsulation format Ĉ which is then transmitted to receiver R. Each such received encapsulated buffer C can be unpacked, decoded and finally read by R during step 440 using algorithm Read. Finally, algorithms Write, Wrap and Read use as a subroutine algorithm KEvolve. Algorithm Read needs not run in synchronization with algorithms Write and Wrap: in particular, keys $\sigma_{w,j}$ and $\sigma_{r,j}$ need not evolve in coordination or at the same pattern or speed; instead, at a given point in time S and R generally store keys $\sigma_{w,j_w}$ and $\sigma_{r,j_r}$ respectively, with $j_w \neq j_r$.

Silent Alarm Algorithms

As previously indicated, the key generation algorithm (KGen) is a probabilistic algorithm with security parameter κ that returns a pair $(\sigma_{w,0}, \sigma_{r,0})$ of initial evolving secret keys, where $\sigma_{w,0}$ is a secret writing key and $\sigma_{r,0}$ is the secret reading key, a pair $(\sigma_w, \sigma_r)$ of permanent secret update keys, and a public key pk (to be used by all algorithms), expressed as $((\sigma_{w,0}, \sigma_{r,0}), (\sigma_w, \sigma_r), pk) \leftarrow kGen(1^\kappa)$.

FIG. 5 illustrates pseudo code for an exemplary implementation of the key generation algorithm 500 (KGen). Given the security parameter κ, the exemplary key-generation algorithm KGen operates according to the following steps:

1. Initiate an authenticated encryption scheme by running $\sigma_{AE} \leftarrow AEKeyGen(1^\kappa)$.

2. Initiate a low layer FS-PRNG scheme (to be used for producing the sequence of forward-secure pseudorandom numbers $r=(r_0, r_1, r_2, \ldots)$) by running $(s_0, \sigma) \leftarrow GenKey(1^\kappa)$.

3. Initiate a high layer FS-PRNG scheme (to be used for producing the sequence of forward-secure pseudorandom numbers $r'=(r'_0, r'_1, r'_2, \ldots)$) by running $(s'_0, \sigma) \leftarrow GenKey(1^\kappa)$.

4. Create the first pseudorandom numbers by running $(r_0, s_1) \leftarrow \text{Next}_\sigma(s_0, 1)$ and $(r'_0, s'_1) \leftarrow \text{Next}_{\sigma'}(s'_0, 1)$.

5. Set $\sigma_{w,0} = \sigma_{r,0} = (r_0, s_1, r'_0, s'_1, 0, 0)$, $\sigma_w = \sigma_r = (\sigma, \sigma')$ and $pk = \sigma_{AE}$.

6. Return $((\sigma_{w,0}, \sigma_{r,0}), (\sigma_w, \sigma_r), pk)$.

As previously indicated, the key evolution algorithm (KEvolve) is a deterministic algorithm that, starting with initial state $(s_1, s'_1)$, takes as input a secret writing $\sigma_{w,j}$ or reading $\sigma_{r,j}$ key, the corresponding update key $\sigma_w$ or $\sigma_r$, a step integer t and an auxiliary information $b \in \{low, high\}$, and updates the writing, or reading, key to $\sigma_{w,j+t}$ or $\sigma_{r,j+t}$ respectively, expressed as $\sigma_{w,j+t} \leftarrow \text{KEvolve}_{\sigma_w}(\sigma_{w,j}, t, b)$ and $\sigma_{r,j+t} \leftarrow \text{KEvolve}_{\sigma_r}(\sigma_{r,j}, t, b)$, where for simplicity the update keys $\sigma_w$ and $\sigma_r$ are considered as implicit inputs of the algorithm.

FIG. 6 illustrates pseudo code for an exemplary implementation of the key evolution: algorithm 600 (KEvolve). Given the current secret writing or reading key $(r_i, r'_j, i, j)$, the corresponding update key $(\sigma, \sigma')$, a step integer t and a control string b, the exemplary key-evolution algorithm KEvolve operates according to the following steps:

1. If $t \leq 0$, then return $(r_i, r'_j, i, j)$.
2. If b=low then
  (a) Create the next low layer pseudorandom number by running $r_{i+t} \leftarrow \text{Next}_\sigma(r_i, t)$.
  (b) Delete $r_i$.
  (c) Return $(r_{o+t}, r'_j, i+t, j)$.
3. If b=high then
  (a) Create the next high layer pseudorandom number by running $r_{j+t} \leftarrow \text{Next}_{\sigma'}(r_j, t)$.
  (b) Delete $r_j$.
  (c) Return $(r_i, r'_{j+t}, i, j+t)$.

As previously indicated, the probabilistic Write algorithm takes as input a secret writing key $\sigma_{w,j}$, a message $m \in \{0,1\}^*$ and a buffer C, encodes m in buffer C at a slot determined by $\sigma_{w,j}$, updates the writing key by running algorithm $\text{KEvolve}_{\sigma_w}$ and returns the updated key $\sigma_{w,j+1} \leftarrow \text{KEvolve}_{\sigma_w}(\sigma_{w,j}, 1, b)$ and an updated buffer C'. Write adds m in C, expressed as $(\sigma_{w,j+1}, C') \leftarrow \text{Write}(\sigma_{w,j}, m, C)$.

Figure 7:
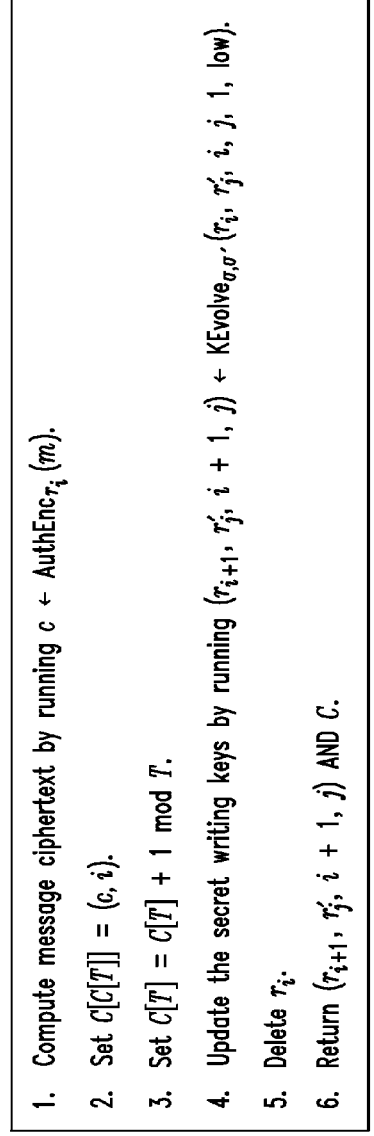
FIG. 7 illustrates pseudo code for an exemplary implementation of a write algorithm incorporating aspects of the present invention.

FIG. 7 illustrates pseudo code for an exemplary implementation of the Write Algorithm 700 (Write). Given a secret writing key $(r_i, r'_j, i, j)$, a message $m \in \{0,1\}^*$ and a buffer C, the exemplary algorithm Write operates according to the following steps:

1. Compute message ciphertext by running $c \leftarrow \text{AuthEnc}_{r_i}(m)$.
2. Set $C[C[T]] = (c, i)$.
3. Set $C[T] = C[T] + 1 \mod T$.
4. Update the secret writing keys by running $(r_{i+1}, r'_j, i+1, j) \leftarrow \text{KEvolve}_{\sigma,\sigma'}(r_i, r'_j, i, j, 1, low)$.
5. Delete $r_i$;
6. Return $(r_{i+1}, r'_j, i+1, j)$ and C.

Figure 8:
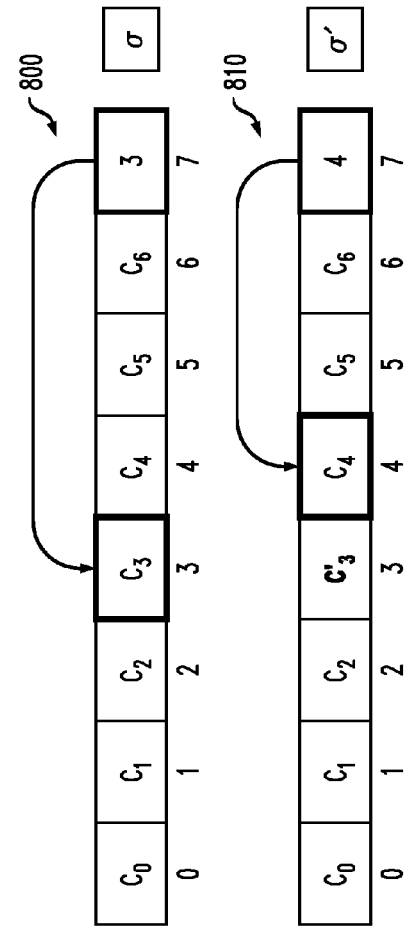
FIG. 8 illustrates an exemplary writing of a message m by the write algorithm of FIG. 7.

FIG. 8 illustrates an exemplary write operation on a message m. As shown in FIG. 8, at a time 800, the message m is added to the buffer at the current-index position 3 encoded as $C'_3$. $C'_3$ is an authenticated encryption of message m using the secret state $\sigma$ as the secret key. The secret state $\sigma$ is then updated at a time 810 to $\sigma'$ and the current index is updated to 4, for the next message.

As previously indicated, the probabilistic Wrap algorithm takes as input a secret writing key $\sigma_{w,j}$ and a buffer C, encapsulates C, updates the writing key by running algorithm $\text{KEvolve}_{\sigma_w}$ and returns an updated key $\sigma_{w,j+1} \leftarrow \text{KEvolve}_{\sigma_w}(\sigma_{w,j}, 1, b)$ and an encapsulated buffer $\hat{C}$. Wrap encapsulates C to $\hat{C}$, expressed as $(\sigma_{w,k+t}, \hat{C}) \leftarrow \text{Wrap}(\sigma_{w,j}, C)$.

Figures 9, 10:
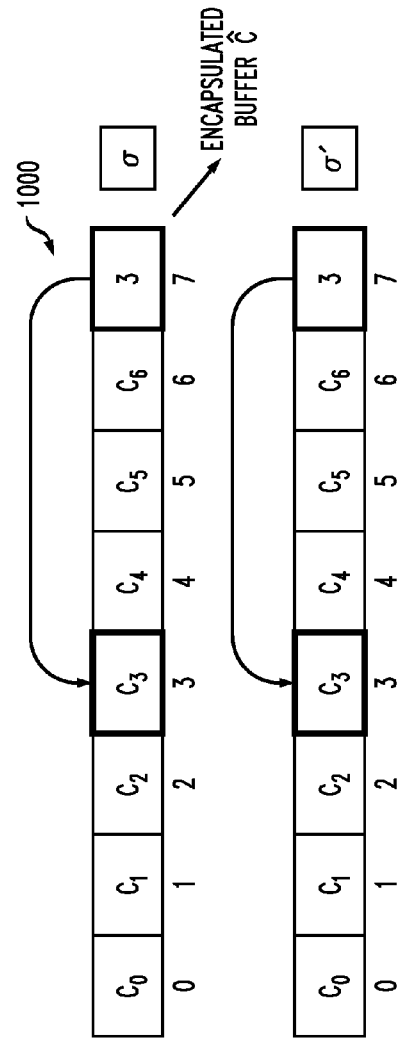
FIG. 9 illustrates pseudo code for an exemplary implementation of a wrap algorithm incorporating aspects of the present invention.
FIG. 10 illustrates an exemplary encapsulation of a buffer C to C by the wrap algorithm of FIG. 9.

FIG. 9 illustrates pseudo code for an exemplary implementation of the Wrap Algorithm 900 (Wrap). Given secret writing key $(r_i, r'_j, i, j)$ and a buffer C, the exemplary Wrap algorithm operates according to the following steps:

1. Compute encapsulated buffer by running $c' \leftarrow \text{AuthEnc}_{r'_j}(C)$.
2. Set $\hat{C} = (c', j)$.
3. Update the secret writing keys by running $(r_i, r'_{j+1}, j+1) \leftarrow \text{KEvolve}_{\sigma,\sigma'}(r_i, r'_j, i, j, 1, high)$.
4. Delete $r'_j$.
5. Return $(r_i, r'_{j+1}, i, j+1)$ and $\hat{C}$.

FIG. 10 illustrates an exemplary encapsulation of a buffer C to $\hat{C}$ by the wrap algorithm of FIG. 9. The encapsulated buffer $\hat{C}$ is an authenticated encryption of $(C_0, C_1, C_2, C_3, C_4, C_5, C_6, C_7)$ using the secret state $\sigma$ as secret key. The secret state $\sigma$ is updated in the data structure to $\sigma'$ and $(\hat{C}, i)$ is sent to the receiver R.

As previously indicated, the deterministic Read algorithm takes as input a secret reading key $\sigma_{r,j}$ and an encapsulated buffer $\hat{C}$, decodes all buffer slots, updates the reading key by running algorithm $\text{KEvolve}_{\sigma_r}$, and returns an updated key $\sigma_{r,k+t} \leftarrow \text{KEvolve}_{\sigma_r}(\sigma_{r,j}, t, b)$ for some $t > 0$ and a sequence $M = (m_1, \ldots, m_T)$ of T messages in $U = L \cup \{\emptyset, \bot\}$. Read produces messages M and write$(\sigma_{r,j+1}, M) \leftarrow \text{Read}(\sigma_{r,j}, \hat{C})$.

FIG. 11 illustrates pseudo code for an exemplary implementation of the Read Algorithm 1100 (Read). Given secret reading key $(r_i, r'_j, i, j)$ and an encapsulated buffer $\hat{C} = (c', j')$, algorithm Read operates according to the following steps:

1. If $j' \leq j$, then return $[(r_i, r'_j, i, j), (\bot, \ldots, \bot)]$.
2. Update the secret reading keys by running $(r_i, r'_j, i, j') \leftarrow \text{KEvolve}_{\sigma,\sigma'}(r_i, r'_j, i, j, j'-j, high)$.
3. Remove encapsulation of $\hat{C} = (c', j')$ by running $C \leftarrow \text{AuthDec}_{r'_j}(c')$.
4. If $C = \bot$, then return $[(r_i, r'_j, i, j), (\bot, \ldots, \bot)]$.
5. View C as an array $C[0], C[1], \ldots, C[T-1], C[T]$.
6. Set $I = C[T]$ and if $I < 0$ or $I \geq T$ then return $[(r_i, r'_j, i, j), (\bot, \ldots, \bot)]$.
7. Set $x = 0$.
8. For $0 \leq k < T$, do the following:
  (a) Read $C[k+I \mod T]$ as $(c, l)$.
  (b) If $l \leq i$, then return $[r_i, r'_j, i, j), (\bot, \ldots, \bot)]$.
  (c) If $k = 0$ then set $x = l$.
  (d) If $k \neq 0$ then:
    i. If $l \neq x+1$, then return $[(r_i, r'_j, i, j), (\bot, \square, \bot)]$.
    ii. Set $x = l$.
  (e) Update the secret reading keys by running $(r_i, r'_j, i, j') \leftarrow (\text{KEvolve}_{\sigma,\sigma'}(r_i, r'_j, i, j', 1-i, low)$.
  (f) Decrypt message ciphertext c by running $m_k \leftarrow \text{AuthDec}_{r_i}(c)$.
9. Set M=
10. Return $(r_i, r'_j, i, j')$ and M.

A number of modifications of the above algorithm descriptions may lead to better efficiency depending on exact settings. Above, the high layer encryption is applied on the contents of the entire buffer. Alternatively, this encryption may be performed in a per-message manner (similar to low layer encryption, but this time for all messages in the buffer). Depending on the system setting, one approach may achieve different performance levels than the other.

Above, an asynchronous evolution process is used for the two PRNG sequences r and r'. That is, the secret keys $r_i$ for the low encryption layer are computed independently of the secret keys for the high encryption layer. Alternatively, a synchronous evolution process may be employed where the two sequences r and r' evolve simultaneously, even if some of the produced keys are never used. Depending on the system setting, one approach may achieve different performance levels than the other.

Concrete Authenticated Encryption Schemes

A concrete Authenticated Encryption scheme is defined as follows:

$$AuthEnc_K(m) = K \oplus (m \| MAC_r(m) \| r)$$

for a random r, where K is the secret key $\sigma_{AE}$ of the scheme and $MAC_r$ is any keyed message authentication code. Here, the sizes of m, $MAC_r(m)$ and r should be fixed and their sum should be equal to the size $|K|$ of K. In this case, $AuthDec_K(c)$ is defined as follows:

1. Compute $d = c \oplus K$.
2. View d as a string of type $m\|t\|r$, where the sizes of m, t and r are fixed and known.
3. Compute $t' = MAC_r(m)$.
4. If $t' = t$ then return m, else return $\bot$.

This is a "MAC-then-encrypt" type of authenticated encryption scheme. Alternatively, an "Encrypt-then-MAC" type can be used, using the following scheme (see, e.g., Victor Shoup, "Sequences of Games: A Tool for Taming Complexity in Security Proofs," http://eprint.iacr.org/2004/332, 2004):

The secret key is a pair of numbers (s,k)

Encrypt using a pseudorandom function $F_s$ that maps n bits to l bits, where $|m| = l$, and a MAC which is an unpredictable hash function $H_k$ that maps n+l bits to w bits, as follows:

(1) Randomly choose string x of size n bits.
(2) Set $c \leftarrow F_s(x) \oplus m$.
(3) Set $t \leftarrow H_k(x\|c)$.
(4) Return $\psi = (x, c, t)$.

Decrypt as follows:

(1) View $\psi$ as (x,c,t), where $|x| = n$, $|c| = l$ and $|t| = w$.
(2) If $t = H_k(x\|c)$ then return $m = F_s(x) \oplus c$, else return $\bot$.

Concrete FS-PRNG Schemes

An FS-PRNG scheme may correspond to a one-way hash chain as follows: starting from an initial random seed $s_0$, apply a suitable one-way function $f_0$ to get $s_{i+1} = f_0(s_i)$ and a suitable one-way function $f_1$ to get $r_i = f_1(s_i)$. (Alternatively, the simple derivation $r_{i+1} = f(r_i)$ can be used, where $f$ is a one-way function.) Here, typical instantiation of a one-way function may be a pre-image resistant hash function, e.g., the SHA-1 family of hash functions.

Certain optimizations with respect to the state size $|s_i|$ and/or the time efficiency to implement the t-step version of the underlying Next function can be achieved by different designs of the FS-PRNG scheme, where for instance one-way trees may be used, but such designs are outside the scope of our work.

Analysis

For the disclosed exemplary Main Construction of the silent alarm channels discussed above, the following results can be shown.

Correctness

Since messages are included in the exemplary buffer in a FIFO manner, i.e., in a first-in-first-out manner, and since the indices of both the low layer and the high layer encryption keys are included in the encapsulated buffer (step 2 in algorithms Write and Wrap), under normal operation of the exemplary system, it is always possible for the receiver to find the corresponding secret keys for decrypting and reconstructing the exact sequence of the T most recent messages that were written in the channel before the encapsulation of the buffer.

Immutability

Since any message that is added in the buffer is encrypted in a verifiable way through the low layer authenticated encryption scheme (steps 1 and 2 in algorithm Write), individual messages cannot be undetectably tampered with (enforced by step 8.f in algorithm Read). Additionally, since the indices of the secret keys of the low layer authenticated encryption are authenticated through the high layer authentication encryption (step 2 in algorithm Write and step 1 in algorithm Wrap), messages belonging in an individual encapsulated buffer cannot be undetectably received out of order, either across different buffers (step 8.b in algorithm Read) or within the same buffer (step 8.d.i in algorithm Read).

Stealthiness

Since both individual messages and encapsulated buffers are encrypted through the low layer and respectively high layer authenticated encryption, and since the buffer is of fixed size T, observing encapsulated buffers before the compromise or actual buffer contents after the compromise reveals no information about the actual messages previously added in the channel or about whether messages have been ever added in the channel.

Persistence

Since read operations over the fixed-size buffer are not destructive, but rather a message stays in the buffer for another T−1 successive message additions, persistence is achieved.

Applications

The disclosed silent alarm scheme is a general-purpose tool that can be applied in many different communication and computation settings and find use in many different real-life applications that need one or more of the four achieved properties (correctness, immutability, stealthiness and persistence). A few examples of the range of possible applications for the disclosed silent alarms in hardware and software are discussed. Three exemplary applications and their specific technical challenges are discussed.

Security Logs

An endpoint device, such as the endpoint 105 of FIG. 1, can embed a silent-alarm channel C in its security log. If a suspicious event occurs (e.g., the device installs a piece of untrusted software), the time and nature of the event can be transmitted in the channel, C. A log-analysis tool (even one that only samples the log) can then detect and extract this message.

Consider the setting where an endpoint 105 (e.g., a desktop machine or a Web server or a router or a firewall in an enterprise environment) routinely creates and stores status-related security logs that describe the state that the endpoint machine exists at various points in time. These logs are periodically sent to an enterprise server 125 that collects, stores, processes and analyzes the logs that arrive from different enterprise endpoints 105. The provided service by such a system is of very high importance: this is the core functionality of any SIEM (Security Information and Event Management) system that allows the end-server to perform a security monitoring of endpoint machines and defend, eliminate, limit or analyze possible attacks against the enterprise IT infrastructure.

For any such system to be useful, it is important that the log collection and transmission process operates securely, or otherwise an attacker will attempt to destroy or dismiss the log-collection process to the attacker's own benefit (e.g., by removing from the endpoint device collected log events that indicate the attack on the endpoint machine).

Silent alarms provide a useful solution to the above problem. The endpoint 105 implements the sender 110 and the log-collection server 125 implements the receiver 130 in a silent alarm protocol. Security logs that are created by the endpoint 105 are added in the silent alarm buffer which is maintained in the endpoint 105. Periodically, the contents of the buffer are encapsulated and sent to the log-collection server 125. Silent alarms thus ensure that: (1) an attacker 150 that compromises the endpoint 105 cannot tamper with the already collected and stored logs (thus, the attacker cannot delete logs that prove its malicious behavior); (2) an initially observing attacker 150 cannot tell if any logs were ever sent through the silent alarm channel 120; and (3) even logs that correspond to rare events will persistently reach the server 125, even if the actual communication channel 120 between the endpoint 105 and the server 125 is lossy.

Related to the correctness property, note that the attacker can effectively delete old messages in the buffer (that potentially reveal its presence) by only rewriting new messages in the buffer. But for a system that has been correctly configured so that the buffer is read frequently enough by the server 125, this attack must be performed at very high speed, i.e., the attacker 150 must write at least T messages to completely overwrite the buffer before it gets transmitted. By further configuring the system so that the required overwriting speed is higher than the logs' false positive rate under normal operation of the endpoint device, it can be ensured that this attack will be detected by the server 125, which is itself a high-assurance special log message for the fact that the device is under attack.

One-Time Passcode Tokens

Hardware tokens that generate one-time passcodes, such as RSA SecurID$^{(R)}$ one-time passcodes, (see, e.g., RSA, The Security Division of EMC, RSA Hardware Authenticators Product Description. http://www.rsa.com/node.aspx?id=1158, 2011, incorporated by reference herein, are common in enterprise settings. The present invention recognizes that silent alarms embedded in passcodes can be used as a form of tamper detection. If an attempt of physical compromise is detected, such as the token case being opened, the alarm is triggered. Note that persistence is a key property here, as not all passcodes flow from token to server. For instance, time-based tokens generate a new passcode every minute, while users generally log in at most a few times a day.

Consider a hardware token that is used to derive one-time passwords for authentication purposes. If the token is lost and gets tampered with, a silent alarm can be used to send a one-bit message, e.g., a red flag, denoting that the token has been compromised. Here, a sensor that detects physical tampering with the token triggers a signal that changes the state of the token: this corresponds to adding a red-flag message in the size-one buffer of the token. Due to stealthiness, the attacker cannot infer that this has taken place; therefore, by piggybacking this red-flag message with the next password that is used by the attacker and sent to the authentication server, the server is able to detect that tampering took place and accordingly take the necessary actions (e.g., to deny access to critical operations and, if possible, to even proceed with the recovery of the attacker).

Sensors

As small, low-powered, wireless devices, sensors are highly vulnerable to physical compromise. The present invention recognizes that a silent alarm channel can be used to signal tampering to a base station. Sensor networks often aggregate the emissions of sets of nodes. Thus, the silent alarm channels need to be homomorphic, but also allow isolation of individual messages and senders' identities.

Consider sensor devices that participate in a sensor network to report some type of sensed data back to a collection server. Silent alarms can be used to reliably and privately communicate to the server a message about possible tampering with the sensor device. Different silent alarm messages coming from different sensors can be appropriately aggregated so that upon receipt of one red-flag message the server can detect that at least one sensor has been compromised. Using error-correction, techniques it is possible to further allow the server 125 to pinpoint which of the sensors have been compromised.

CONCLUSION

As previously indicated, the above-described embodiments of the invention are presented by way of illustrative example only. Numerous variations and other alternative embodiments may be used, as noted above.

The present invention provides a new general-purpose cryptographic primitive that can be used to realize a secure channel. According to one exemplary implementation of the invention, the disclosed silent alarms allow a possibly compromised sender to transmit messages that have been created prior to the time of compromise reliably: messages are protected with respect to the integrity of their contents and order, messages are protected with respect to the privacy of their contents and transmission, and they are also protected with respect to their persistent delivery to the receiver, despite a potentially lossy intermediate communication means.

Additional details regarding certain conventional cryptographic techniques referred to herein may be found in, e.g., A.J. Menezes et al., Handbook of Applied Cryptography, CRC Press, 1997, which is incorporated by reference herein.

The illustrative embodiments of the invention as described herein provide secure transmission of messages over a silent alarm channel. Advantageously, the illustrative embodiments do not require changes to existing communication protocols. It is therefore transparent to both existing applications and communication protocols.

It should again be emphasized that the particular authentication and communication techniques described above are provided by way of illustration, and should not be construed as limiting the present invention to any specific embodiment or group of embodiments. For example, as previously noted, the described embodiments may be adapted in a straightforward manner to operate with other types of credentials or authentication information. Also, the particular configuration of system elements, and their interactions, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for transmitting a plurality of messages from a sender to a receiver, comprising the steps of:
   obtaining said plurality of messages at said sender;
   encrypting each of said plurality of messages using an atomic authenticated encryption scheme, wherein said authenticated encryption scheme employs a secret key shared by said sender and said receiver; and
   transmitting said plurality of encrypted messages on a forward-secure channel to said receiver, wherein said forward-secure channel comprises a buffer having a plurality of entries, wherein each of said entries stores one of said encrypted messages and wherein at least one of said plurality of encrypted messages is maintained in said forward-secure channel after a receiver reads said channel, wherein at least one of said steps employs at least one hardware device.

2. The method of claim 1, wherein said forward-secure channel comprises a buffer having a fixed number of said entries.

3. The method of claim 1, further comprising the step of encrypting said buffer using a wrap function.

4. The method of claim 3, wherein said wrap function processes a secret writing key and said buffer and encapsulates said buffer.

5. The method of claim 4, wherein said wrap function further comprises the steps of updating said secret writing key and returning said updated secret writing key and said encapsulated buffer.

6. The method of claim 1, wherein said transmitting step is performed by a write function that processes a secret writing key, one of said encrypted messages and said buffer and encodes said encrypted message in said buffer at an entry determined by an index.

7. The method of claim 6, wherein said write function further comprises the steps of updating said secret writing key and returning said updated secret writing key and an updated buffer.

8. The method of claim 1, wherein said transmitting step further comprises the step of transmitting said plurality of encrypted messages redundantly.

9. The method of claim 1, further comprising the step of generating at least one of a pair of initial evolving secret keys; a pair of permanent secret update keys; and a public key, using a key generation algorithm with security parameter κ.

10. The method of claim 1, further comprising the step of updating one or more of a writing key and a reading key using a key evolution algorithm that employs a corresponding update key.

11. The method of claim 1, wherein said receiver reads said channel using a read function that processes a secret reading key and an encapsulated buffer, and wherein said read function further comprises the steps of decoding said plurality of entries, updating said secret reading key and returning said updated secret reading key and a sequence of encrypted messages from said plurality of entries.

12. The method of claim 11, wherein said receiver further processes said sequence of encrypted messages using said secret reading key and returns a second sequence of messages verifying said sequence of messages.

13. The method of claim 1, wherein said encrypted messages comprise entries in a security log, wherein said entries comprise security alerts related to a security of a device.

14. The method of claim 1, wherein said encrypted messages comprise one-time passwords derived by authentication tokens.

15. The method of claim 1, wherein said encrypted messages comprise tampering notifications from one or more sensor devices.

16. The method of claim 1, wherein said buffer further comprises a current index indicating where a next encrypted message will be stored in said buffer.

17. The method of claim 16, wherein said current index is randomized at initialization.

18. A method for transmitting a plurality of messages from a sender to a receiver, comprising the steps of:
   obtaining one or more write keys at said sender;
   adding one or more messages in an encoded format to a buffer using a first level of encryption comprising an atomic authenticated encryption scheme, wherein said authenticated encryption scheme employs a secret key shared by said sender and said receiver and wherein at least one of said one or more encrypted messages is maintained in said buffer after a receiver reads said at least one message;
   encapsulating said buffer into an encapsulated buffer using a second level of encryption; and
   transmitting a content of said encapsulated buffer to said receiver, wherein at least one of said steps employs at least one hardware device.

19. The method of claim 18, wherein said buffer has a fixed number of entries.

20. The method of claim 18, wherein said transmitting step employs a forward-secure channel comprising said buffer.

21. The method of claim 18, wherein said encapsulating step employs a wrap function.

22. The method of claim 21, wherein said wrap function processes a secret writing key and said buffer and encapsulates said buffer.

23. The method of claim 18, wherein said transmitting step is performed by a write function that processes a secret writing key, one of said encrypted messages and said buffer and encodes said encrypted message in said buffer at an entry determined by an index.

24. The method of claim 18, wherein said transmitting step further comprises the step of transmitting said plurality of encrypted messages redundantly.

25. The method of claim 18, further comprising the step of updating one or more of a writing key and a reading key using a key evolution algorithm that employs a corresponding update key.

26. The method of claim 18, wherein said receiver reads said encapsulated buffer using a read function that processes a secret reading key, and wherein said read function further comprises the steps of decoding said encrypted messages in said encapsulated buffer.

27. The method of claim 26, wherein said receiver further processes said sequence of encrypted messages using said secret reading key and returns a second sequence of messages verifying said sequence of messages.

28. The method of claim 18, wherein said buffer further comprises a current index indicating where a next encrypted message will be stored in said buffer.

29. The method of claim 28, wherein said current index is randomized at initialization.

30. An apparatus for transmitting a plurality of messages from a sender to a receiver, the apparatus comprising:
   a memory; and
   at least one hardware device, coupled to the memory, operative to implement the following steps:
   obtain said plurality of messages at said sender;
   encrypt each of said plurality of messages using an atomic authenticated encryption scheme, wherein said authenticated encryption scheme employs a secret key shared by said sender and said receiver; and
   transmit said plurality of encrypted messages on a forward-secure channel to a said receiver, wherein said forward-secure channel comprises a buffer having a plurality of entries, wherein each of said entries stores one of said encrypted messages and wherein at least one of said plurality of encrypted messages are maintained in said forward-secure channel after a receiver reads said channel.

31. The apparatus of claim 30, wherein said forward-secure channel comprises a buffer having a fixed number of said entries.

32. The apparatus of claim 30, wherein said at least one hardware device is further configured to encrypt said buffer using a wrap function.

33. The apparatus of claim 32, wherein said wrap function processes a secret writing key and said buffer and encapsulates said buffer.

34. The apparatus of claim 30, wherein said transmission is performed by a write function that processes a secret writing key, one of said encrypted messages and said buffer and encodes said encrypted message in said buffer at an entry determined by an index.

35. The apparatus of claim 30, wherein said transmission transmits said plurality of encrypted messages redundantly.

36. The apparatus of claim 30, wherein said receiver reads said channel using a read function that processes a secret reading key and an encapsulated buffer, and wherein said read function further comprises the steps of decoding said plurality of entries, updating said secret reading key and returning said updated secret reading key and a sequence of encrypted messages from said plurality of entries.

37. The apparatus of claim 36, wherein said receiver further processes said sequence of encrypted messages using said secret reading key and returns a second sequence of messages verifying said sequence of messages.

38. The apparatus of claim 30, wherein said buffer further comprises a current index indicating where a next encrypted message will be stored in said buffer.

39. The apparatus of claim 38, wherein said current index is randomized at initialization.

\* \* \* \* \*